United States Patent
Birk et al.

(10) Patent No.: US 8,844,671 B2
(45) Date of Patent: Sep. 30, 2014

(54) APPARATUS FOR DAMPING SOUND IN THE OPTICAL BEAM PATH OF A MICROSCOPE, AND MICROSCOPE HAVING A CORRESPONDING APPARATUS

(71) Applicant: Leica Microsystems CMS GmbH, Wetzlar (DE)

(72) Inventors: Holger Birk, Meckesheim (DE); Volker Seyfried, Nussloch (DE); Dirk-Oliver Fehrer, Bad Schoenborn (DE); Vishnu Varden Krishnamachari, Mannheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 13/894,726

(22) Filed: May 15, 2013

(65) Prior Publication Data

US 2013/0306398 A1    Nov. 21, 2013

(30) Foreign Application Priority Data

May 16, 2012    (DE) .......................... 10 2012 208 250

(51) Int. Cl.

| | | |
|---|---|---|
| *G10K 11/172* | (2006.01) | |
| *H02K 5/24* | (2006.01) | |
| *G02B 26/10* | (2006.01) | |
| *G02B 21/24* | (2006.01) | |
| *G10K 11/00* | (2006.01) | |
| *H02K 5/00* | (2006.01) | |
| *G02B 26/00* | (2006.01) | |
| *G10K 11/175* | (2006.01) | |

(52) U.S. Cl.
CPC ............ *G10K 11/002* (2013.01); *G02B 26/105* (2013.01); *G10K 11/172* (2013.01); *G02B 21/24* (2013.01); *G10K 11/175* (2013.01)
USPC ........ 181/200; 181/198; 181/202; 359/217.3; 359/201.2; 359/212.1

(58) Field of Classification Search
CPC ..... G10K 11/002; G10K 11/02; G10K 11/04; G10K 11/16; G10K 11/172; G02B 26/0816; G02B 26/10; G02B 26/105
USPC ................ 181/198, 200, 202, 250, 252, 253; 359/201.2, 212.1, 217.3
See application file for complete search history.

(56) References Cited

U.S. PATENT DOCUMENTS 1,591,088 A * 7/1926 Holmes .......................... 181/251
2,297,046 A * 9/1942 Bourne .......................... 181/250

(Continued)

FOREIGN PATENT DOCUMENTS

DE          734 858 C        4/1943
DE   10 2004 049 437 A1     4/2006

(Continued)

OTHER PUBLICATIONS

Jung Y H et al: "Reduction of aero-acoustic noise originating from a high-speed polygon mirror scanner motor in a laser beam printer utilizing air-flow analysis", Microsystem Technologies; Micro and Nanosystems Information Storage and Processing Systems, Springer, Berlin, DE, Feb. 5, 2011, vol. 17, pp. 771-776.

*Primary Examiner* — Edgardo San Martin
(74) *Attorney, Agent, or Firm* — Crowell & Moring LLP (57) ABSTRACT

An apparatus for damping sound in the optical beam path of a microscope, having an acoustic insulation housing for encapsulating a sound-emitting component, preferably a rapidly moving or oscillating beam deflection means, in particular a resonantly oscillating mirror, the housing comprising at least one optical entrance/exit opening, is characterized in that the housing, preferably the opening of the housing, is embodied and/or configured in such a way that the sound otherwise emerging from the housing is largely extinguished by destructive interference without thereby influencing the optical beam. A microscope having a corresponding apparatus is furthermore claimed.

18 Claims, 10 Drawing Sheets

(56) References Cited

U.S. PATENT DOCUMENTS

| | | | |
|---|---|---|---|
| 3,323,305 A * | 6/1967 | Klees | 60/469 |
| 3,712,412 A * | 1/1973 | Hassett et al. | 181/206 |
| 3,940,721 A * | 2/1976 | Kojima et al. | 333/233 |
| 4,479,509 A * | 10/1984 | Dear et al. | 137/560 |
| 5,033,581 A * | 7/1991 | Feuling | 181/257 |
| 5,477,013 A * | 12/1995 | Okugawa et al. | 181/200 |
| 5,671,081 A * | 9/1997 | Hisa | 359/216.1 |
| 5,877,884 A * | 3/1999 | Yanagisawa | 359/198.1 |
| 6,234,758 B1 * | 5/2001 | Pawelski | 417/26 |
| 6,295,363 B1 * | 9/2001 | Laak et al. | 381/94.1 |
| 6,508,331 B1 * | 1/2003 | Stuart | 181/250 |
| 6,792,907 B1 * | 9/2004 | Kostun et al. | 123/184.57 |
| 7,337,877 B2 * | 3/2008 | Goenka et al. | 181/250 |
| 7,533,760 B1 * | 5/2009 | D'Angelo | 181/241 |
| 8,381,871 B1 * | 2/2013 | Hellie et al. | 181/250 |
| 2005/0194207 A1 * | 9/2005 | Nemit et al. | 181/250 |
| 2006/0050346 A1 | 3/2006 | Kim | |
| 2007/0171502 A1 * | 7/2007 | Birk et al. | 359/225 |
| 2010/0091083 A1 | 4/2010 | Itami et al. | |
| 2010/0212999 A1 * | 8/2010 | Marion et al. | 181/250 |

FOREIGN PATENT DOCUMENTS

| | | |
|---|---|---|
| EP | 0 618 469 A2 | 10/1994 |
| EP | 0 704 617 A1 | 4/1996 |
| EP | 0 741 311 A1 | 11/1996 |
| JP | 6-348280 A | 12/1994 |
| KR | 1995-0002473 | 3/1995 |

* cited by examiner

APPARATUS FOR DAMPING SOUND IN THE OPTICAL BEAM PATH OF A MICROSCOPE, AND MICROSCOPE HAVING A CORRESPONDING APPARATUS

CROSS-REFERENCE TO RELATED APPLICATION

This application claims priority under 35 U.S.C. §119 from German Patent Application No. DE 10 2012 208 250.6, filed May 16, 2012, the entire disclosure of which is herein expressly incorporated by reference.

BACKGROUND AND SUMMARY OF THE INVENTION

The invention relates to an apparatus for damping sound in the optical beam path of a microscope, having an acoustic insulation housing (housing) for encapsulating a sound-emitting component, preferably a rapidly moving or oscillating beam deflection means, in particular a resonantly oscillating mirror, the housing comprising at least one optical entrance/exit opening (opening). The invention further relates to a microscope, preferably a scanning microscope, having a corresponding apparatus.

There exist in microscopes, in particular in scanning microscopes, a variety of sound sources, mostly produced by movable components in the optical beam of the microscope. Acoustic emissions are objectionable in the context of operation of the microscope, on the one hand with regard to the person using the microscope and on the other hand with regard to vibrations resulting from the acoustic emission.

In scanning microscopy, a beam deflection device serves for beam control, in particular for incoupling the illumination light, the sample being scanned, for example, line by line in meander fashion by the deflected illumination beam. Detected light returning from the sample passes through the beam deflection device and is guided to the detectors.

In particular with the use of resonant galvanometers, which drive a mirror that moves or is caused to oscillate around its own rotation axis at a frequency of several kHz, unpleasant objectionable noise occurs at high deflection rates, specifically because of the sound proceeding from the movable parts.

The underlying problem here has already been recognized in practice. Reference is made in this regard, merely by way of example, to DE 10 2004 049 437 A1.

Provision is made therein to position the movably arranged deflection means in a very largely soundproof housing having an entrance window and/or an exit window. The sound source is ultimately encapsulated, and the entrance window and/or exit window are to be understood as optical elements that influence the beam path (illumination beam path and/or detected beam path).

The encapsulation known from DE 10 2004 049 437 A1 is problematic in practice, however, since the windows obligatorily necessary therein are undesirable in optical terms. They result in a transmittance of less than 100% and produce not inconsiderable interference at the interfaces. Even if optical components that are in any case necessary in the beam path (for example, lenses) are used as windows, the need for soundproof installation of the movable parts into a housing entails very considerable limitations. Variable components in particular, for example beam splitter sliders, can be arranged only with extreme difficulty inside a hermetically sealed housing, but principally must be operable or actuatable from outside. The design outlay is considerable, if indeed implementation is possible at all.

Be it noted at this juncture that what is important here is essentially the elimination of sound waves that are caused inside a microscope by rapidly moving parts. The beam deflection device utilized in a scanning microscope, with its rapidly moving, usually resonantly operating deflection means, is recited here merely by way of example and serves for discussion of the teaching claimed. Movements, in particular rapid ones, of components, for example of such deflection means, result in any case in undesired emissions of sound. An acoustic emission is perceived to be particularly objectionable when it is caused by a component that is excited to oscillate, resonantly or nonresonantly, in the range of several kHz, as is routinely the case in the context of scanning microscopy when the mirror serves as a deflection means.

The underlying object of the invention is to configure and refine an apparatus of the species in such a way that acoustic emissions of objectionable sound sources in the optical beam path of a microscope can be efficiently damped without thereby influencing the optical beam path. Also to be described is a corresponding microscope having a suitable apparatus.

The aforesaid object is achieved, with reference to the apparatus, by the features of claim 1. The coordinated claim 17 achieves the object with reference to a microscope, utilizing the apparatus according to the present invention.

The apparatus according to the present invention is characterized in that the housing, preferably the opening of the housing, is embodied and/or configured in such a way that the sound emerging, without soundproof windows, from the housing is largely extinguished by destructive interference without thereby influencing the optical beam.

What has been recognized according to the present invention is that the objectionable sound that occurs in microscopes having rapidly moving components in the beam path can be eliminated but at least contained, in an ingenious and astonishingly simple manner, by the fact that the housing, preferably the opening thereof, is configured in such a way that the sound otherwise emerging from the housing is largely extinguished by destructive interference without thereby influencing the optical beam path. This contrasts with the previously recited existing art according to which entirely passive measures are provided for, namely encapsulation of the sound-emitting components.

It is essential with respect to the present invention that the action relating to acoustic insulation has no effect on the optical beam. The latter can pass unimpeded through the opening or openings of the housing even though the sound is eliminated, but at least very considerably reduced, as a result of interference conditions.

The elimination or reduction of sound according to the present invention is possible in particular when the sound source is an acoustically monochromatic sound source (such that the sound generated has a single frequency, possibly with overtones), as is the case in a scanning microscope having a resonantly oscillating mirror. The reason is that in this case the resulting sound has substantially the frequency component of the resonant oscillating frequency.

As in the existing art, an acoustic insulation housing, hereinafter called a "housing," is provided, the housing comprising at least one opening for beam entrance and/or beam exit. An optical entrance opening and an optical exit opening is provided in ordinary fashion in the housing, and both openings can be damped with reference to acoustic emission in accordance with the same (inventive) principle, namely utilizing destructive interference.

Concretely, it is advantageous if the opening is constituted by a tube extending away from the housing, such that sound damping takes place along the length of the tube.

In very particularly advantageous fashion, the tube is equipped with at least one tube branch protruding laterally from the tube, such that the tube branch can be embodied in the manner of a blind hole. The length of the tube branch is advantageously selected so that sound waves that run into the tube branch and are reflected therein at the end experience a phase change of 180° with respect to the wave running straight ahead, and thus together with the wave running straight ahead in the tube result in destructive interference. The effective length of the tube branch can thus be a quarter, or an odd multiple of a quarter, of the acoustic wavelength.

For maximum sound suppression, the intensity of the two waves, i.e. the intensity of the wave running straight ahead in the tube and the intensity of the wave coming back out of the tube branch, should be identical if possible, but at least similar. It is of further advantage if the tube is equipped with two or more tube branches protruding laterally from the tube, on the one hand in order to magnify the sound-eliminating effect and on the other hand to eliminate sound of different wavelengths, caused for example by different movable components or overtones.

It has already been mentioned previously that the tube branch is closed at the end, a sound reflection wall preferably being embodied there.

The absorption behavior or reflection behavior can be influenced, for example, by tuning the respective tube branch, specifically by adapting the width/diameter and/or length of the tube branch. To modify the length of the tube branch it is possible, in additionally advantageous fashion, to provide a sound reflection wall that modifies the depth of the tube branch; said wall can be carried or constituted by an adjusting screw threadable into the end of the tube, or by an adjustable/insertable adjusting pin, adjusting rod, or adjusting piston. What is ultimately important is that the tube branch be adjustable in terms of length or depth, thereby making possible tuning of the tube branch to the particular sound frequency.

Adjustment and thus tuning of the interference conditions in the tube branch can be accomplished manually, but also in motorized fashion or hydraulically or pneumatically. What is essential here is that even in a context of a change in sound frequency, an optimum adaptation or adjustment is possible in order to implement destructive interference. It is thus conceivable, for example, to perform an automatic readjustment, specifically if the frequency is constantly changing due to differing operation and constant adaptation is necessary. Automated operation is possible in any event with corresponding detection of the parameters.

Alternatively or additionally, tuning of the tube branch in order to generate the necessary destructive interference can be accomplished by selection of a suitable material for the tube/tube branch, the suitable material having a defined sound absorption behavior. Both the geometry of the tube branch and the material can be employed and thus utilized for tuning of the tube branch.

As already mentioned previously, the tube can encompass one or more tube branch(es). Alternatively to the embodiment discussed above, it is possible for the tube branch to be embodied as a bypass, proceeding from the tube and opening back into the tube, having an adapted acoustic wavelength. In very particularly advantageous fashion, the bypass has an acoustic path length that is longer than the tube by an amount equal to half the sound wavelength. This, too, ensures that destructive interference occurs.

In principle, the sound can also be "picked off" in the same fashion from a different location in the interior of the housing and combined, with a corresponding phase delay, with the sound in the opening used by the light path, so that destructive interference occurs.

With reference to the housing and to the tubes proceeding from the housing for definition of the respective openings, it is further advantageous if further (supplementary) measures for damping the objectionable sound are provided. It is possible for this purpose to provide, in the interior of the housing and/or in the interior of the tubes (and optionally the tube branches), acoustic absorbers that at least partially line the respective inner surfaces. Especially for variable-frequency sound sources, it is ideally possible to use a tube lined internally with sound-absorbing material as an optical opening of the housing, without thereby influencing the optical beam path. The provision of an absorber material embodied in the interior of the housing and in a very long tube can be viewed as an alternative to destructive interference, namely along the lines of a tube as a broad-band absorber. Such a lining also has aspects according to the present invention with regard to destructive interference: because the sound propagates at the edge of the tube more slowly, or at least at a different speed, than in the center as a result of the properties of the absorber material, the phase delay of the sound components proceeding at the edge as compared with the sound components proceeding in the center allows the formation, in particular after mixing of the two components over a longer travel distance, of a destructive interference that ultimately once again results in noise suppression toward the outside, namely analogously to the teaching of the present invention.

There are various ways of advantageously embodying and refining the teaching of the present invention. The reader is referred, for that purpose, on the one hand to the claims subordinate to claim 1, and on the other hand to the explanation below of the preferred exemplifying embodiments of the invention with reference to the drawings. In conjunction with the explanation of the preferred exemplifying embodiments of the invention with reference to the drawings, an explanation will also be given of generally preferred embodiments and further developments of the teaching.

DETAILED DESCRIPTION OF EXEMPLARY EMBODIMENTS

Figure 1:
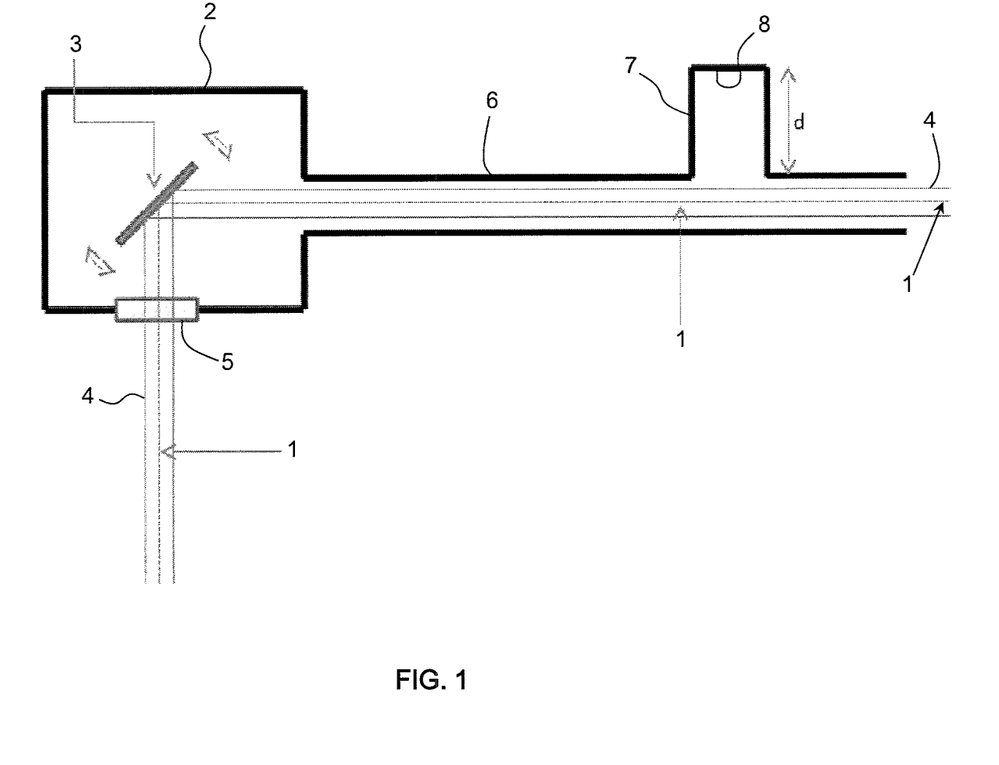
FIG. 1 is a schematic view of an exemplifying embodiment of an apparatus according to the present invention, the optical beam being guided therein through a window to an oscillating mirror (sound source) and being guided from there out of the housing through a tube having a tube branch.

As depicted in FIG. 1, the apparatus for damping sound in optical beam path 1 of a microscope (not shown in the Figures) encompasses an acoustic insulation housing 2 (hereinafter referred to as a "housing") that serves to encapsulate a sound-emitting component. An oscillating mirror 3 constituting an oscillating beam deflection means is shown by way of example as a sound source.

Light beam 4 travels through a window 5 into the interior of housing 2, strikes mirror 3 therein, and in accordance with the angular position of mirror 3 is directed into and through a tube 6, tube 6 defining an entrance opening and exit opening of housing 2.

In order to bring about destructive interference, specifically in order largely to extinguish the sound proceeding from mirror 3 oscillating at high frequency, tube 6 comprises a tube branch 7 that is embodied in the manner of a blind hole, i.e. comprises a sound reflection wall 8 at the end. Tube branch 7 protrudes laterally, for example orthogonally, from tube 6 and is equipped and dimensioned in such a way that it brings about a 180° phase change with respect to the sound wave running straight ahead in tube 6, so that the sound wave reflected out of tube branch 7 results, together with the sound wave running straight ahead, in destructive interference. The length of tube branch 7 can correspondingly be one-quarter of the acoustic wavelength.

Figure 2:
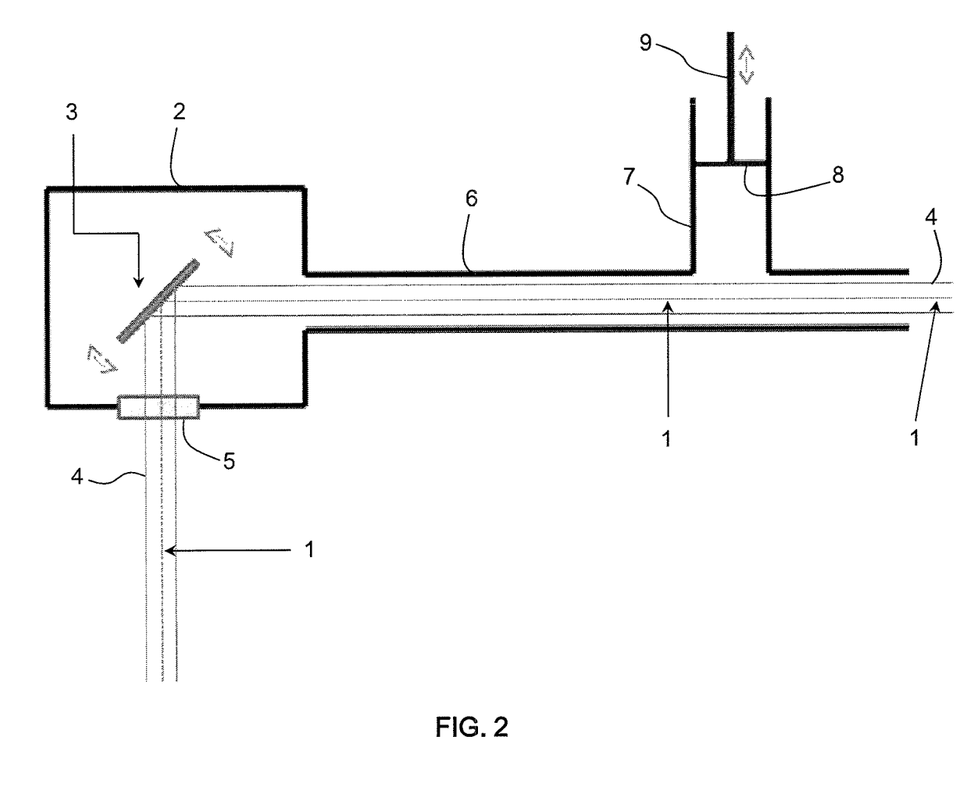
FIG. 2 is a schematic view of the subject matter of FIG. 1, a variable tuning of the tube branch being provided therein, by means of a slider, for adaptation to the respective frequency of the sound.

In the exemplifying embodiment shown in FIG. 2, variable tuning of the length of tube branch 7 is possible, sound reflection wall 8 being carried therein, merely symbolically, by an insertable rod 9. Sound reflection wall 8 and rod 9 can be embodied in the manner of a piston having a piston rod. Motorized or hydraulic/pneumatic operation is conceivable, in particular, for automatic adaptation or tuning of tube branch 7.

Figure 3:
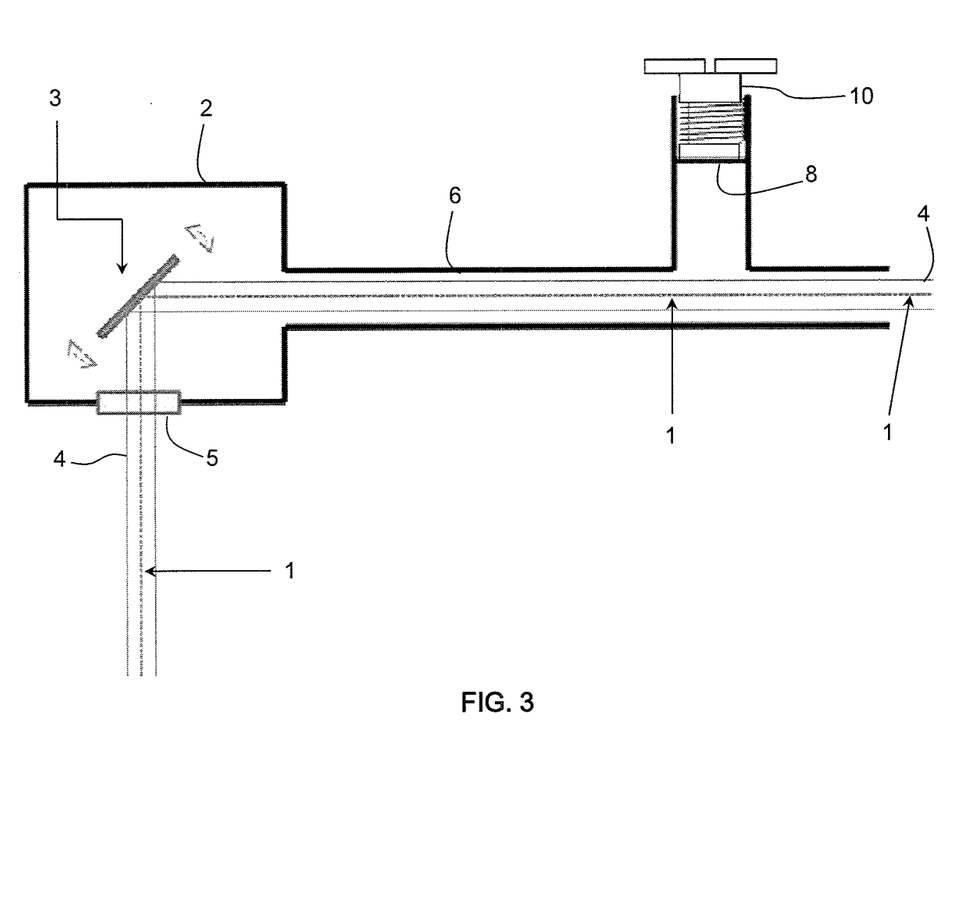
FIG. 3 is a schematic view of the subject matter of FIG. 1 where a screw is provided at the tube branch for adaptation to the respective frequency of the sound.

In the exemplifying embodiment shown in FIG. 3, sound reflection wall 8 is actuated via a screw 10 that in turn can be actuated or driven manually or also via an electric motor, for example utilizing a spindle. The exemplifying embodiment shown in FIG. 3 otherwise corresponds to the exemplifying embodiments of FIGS. 1 and 2.

Figure 4:
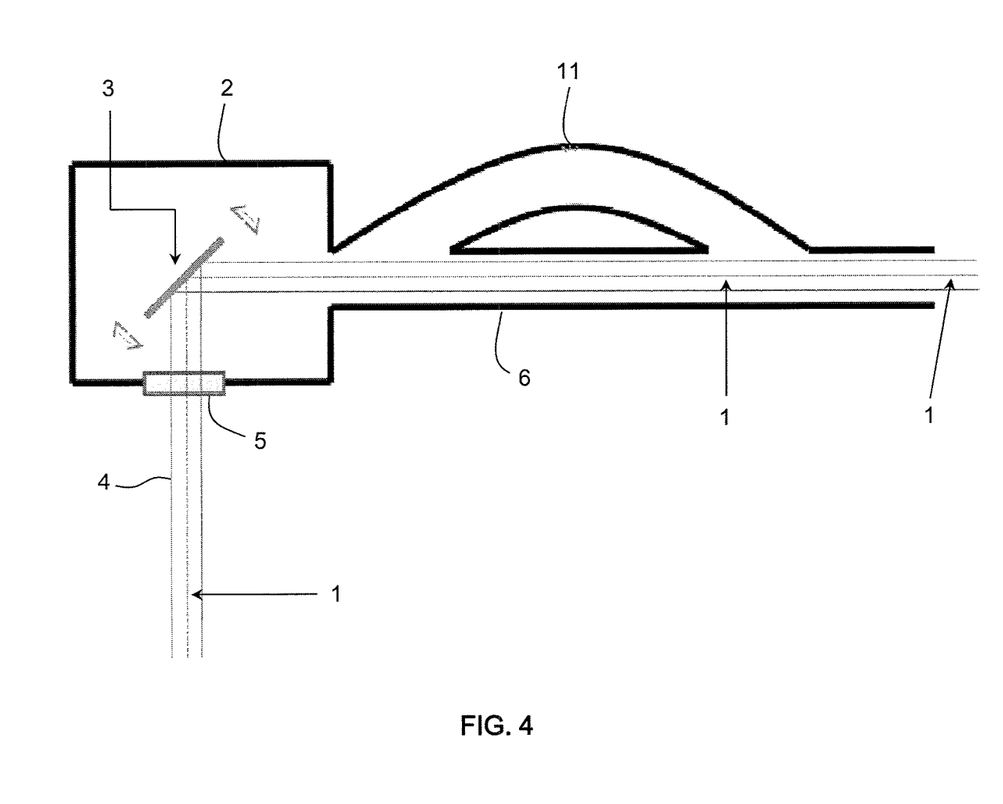
FIG. 4 is a schematic view of a further exemplifying embodiment of an apparatus according to the present invention, the tube therein being equipped with a bypass having an adapted acoustic path length.

FIG. 4 shows a further exemplifying embodiment of an apparatus according to the present invention, tube 6 therein being equipped with a bypass 11 in such a way that bypass 11 is longer than the parallel travel path through tube 6 by an amount equal to half the sound wavelength, so that sound waves that run along both possible sound pathways exhibit a relative phase difference of 180°. The result is that no acoustic pressure is produced at the end of tube 6, specifically because of the destructive interference thereby generated.

Figure 5:
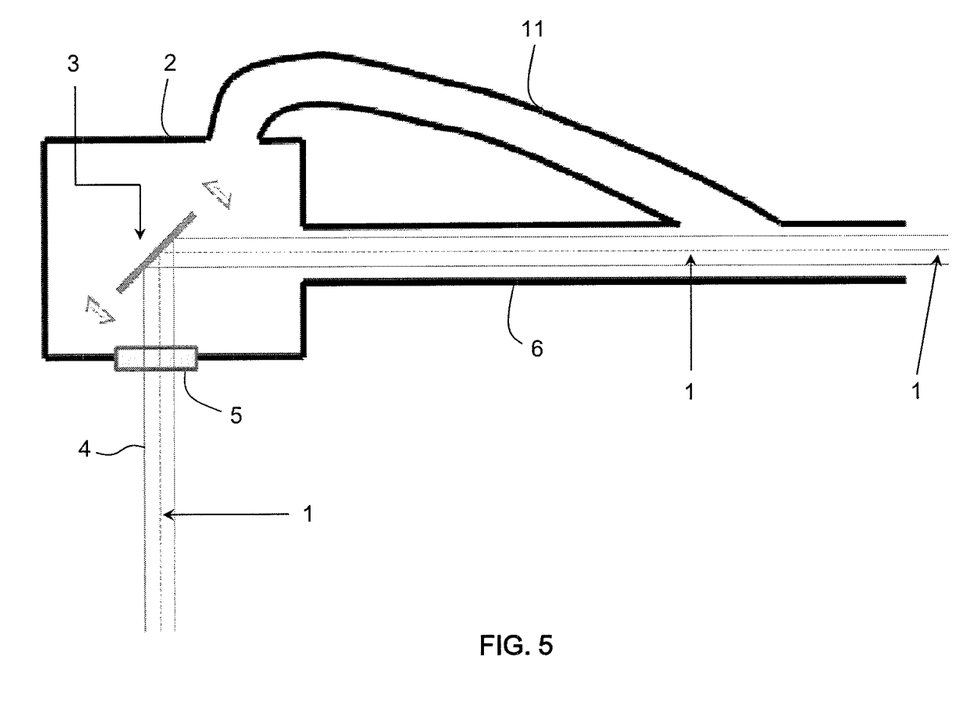
FIG. 5 is a schematic view of a further exemplifying embodiment of an apparatus according to the present invention, a bypass having an acoustic path length extending therein between the housing and tube.

FIG. 5 shows a variant with respect to the exemplifying embodiment of FIG. 4, the sound there being "picked off" directly out of housing 2. Bypass 11 thus extends from housing 2 through a lateral opening into tube 6, so that sound running through bypass 11 is combined, with a corresponding phase delay, with the sound in the opening used by the light path. Destructive interference can be implemented in this fashion as well.

Figure 6:
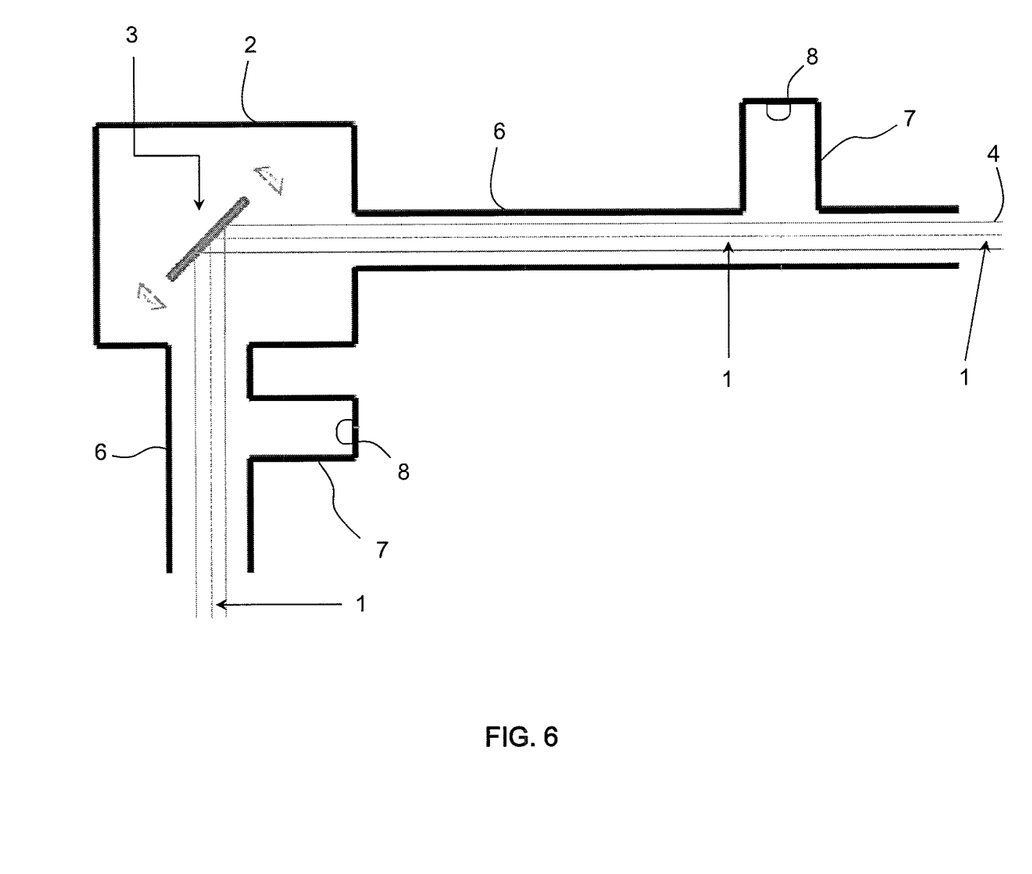
FIG. 6 is a schematic view of a further exemplifying embodiment of an apparatus according to the present invention, the housing therein comprising an entrance opening and an exit opening having tubes that are both equipped with tube branches in order to bring about destructive interference on both sides.

The exemplifying embodiment shown in FIG. 6 defines, by the provision of two tubes 6, actions causing destructive interference in the region of both an optical entrance opening and an optical exit opening. The provision of a window in accordance with the exemplifying embodiments of FIGS. 1 to 5 is not necessary here. Both tubes 6 are equipped with a respective tube branch 7, the two tube branches 7 operating in accordance with the statements above regarding FIGS. 1 to 5.

Figure 7:
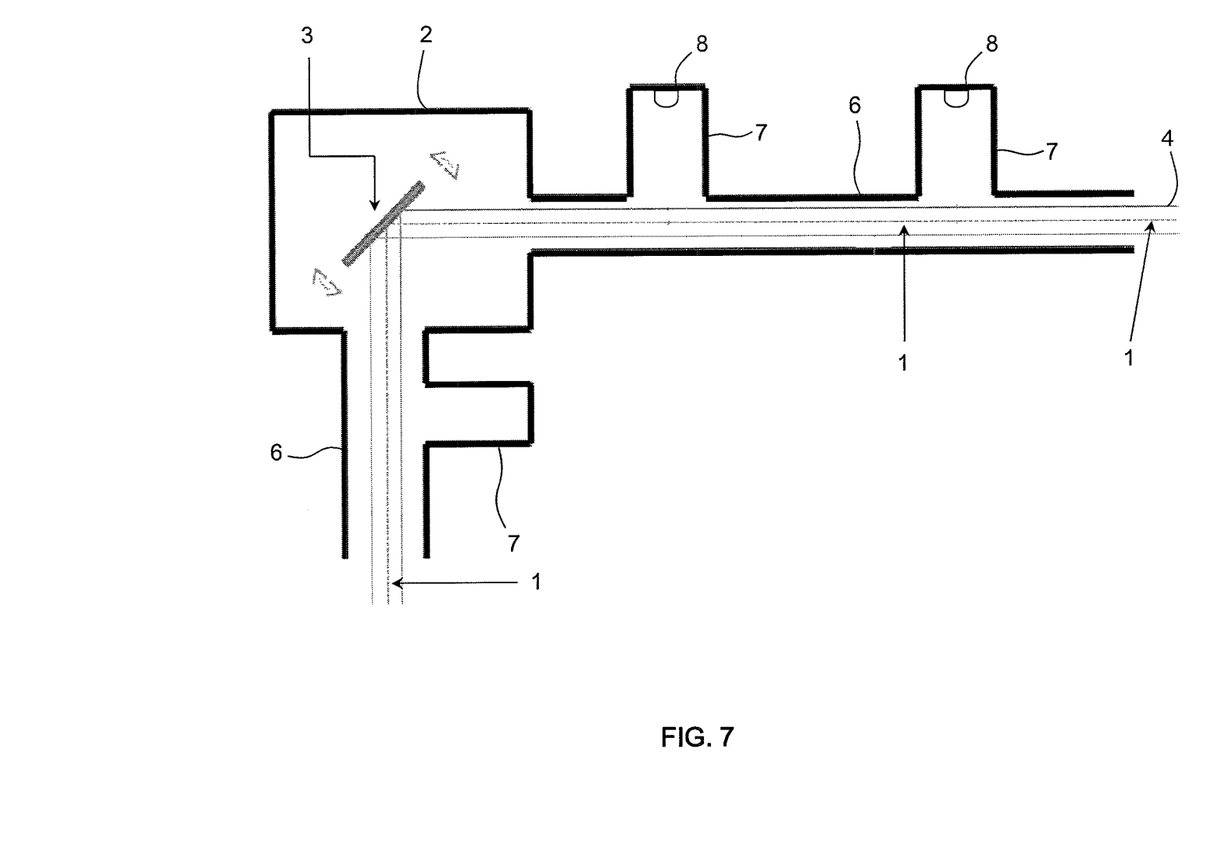
FIG. 7 is a schematic view of a further exemplifying embodiment of an apparatus according to the present invention, one of the tubes therein being equipped with two tube branches in order to intensify the sound damping by means of the sequence of two filters.

The exemplifying embodiment of FIG. 7 adds to the one tube 6 a further, second tube branch, specifically in order to intensify the sound damping, ultimately as a result of the sequence of two "filters." The two tube branches 7 are embodied identically.

Figure 8:
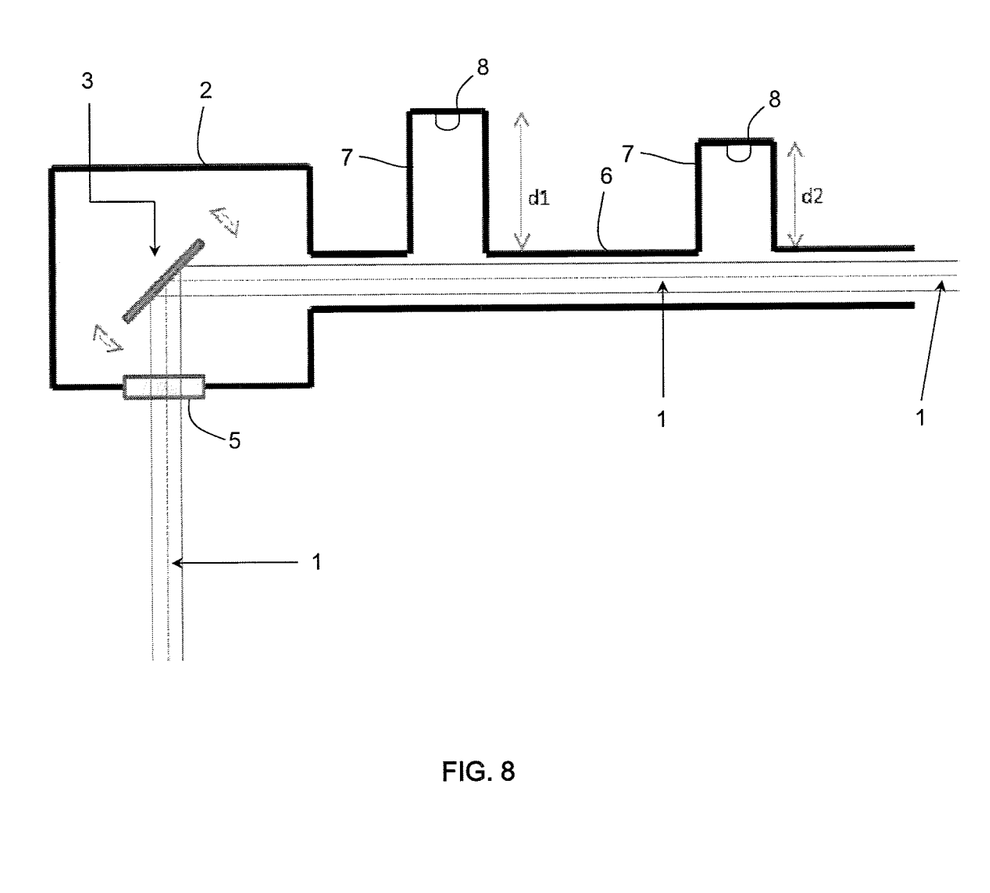
FIG. 8 is a schematic view of a further exemplifying embodiment of an apparatus according to the present invention, two tube branches of different lengths being provided therein in one tube for simultaneous damping of two discrete sound frequencies.

The exemplifying embodiment of FIG. 8 differs from the exemplifying embodiment of FIG. 7, in terms of the tubes comprising the two tube branches 7, in that tube branches 7 are of different lengths. This allows two or more discrete sound frequencies to be damped simultaneously, specifically in accordance with the number and configuration of tube branches 7.

Although only one tube 6 is provided in the exemplifying embodiment shown in FIG. 8, two tubes 6 can also be provided here in accordance with the embodiments of FIGS. 6 and 7, avoiding a window 5. Any corresponding combinations of features are possible.

Figure 9:
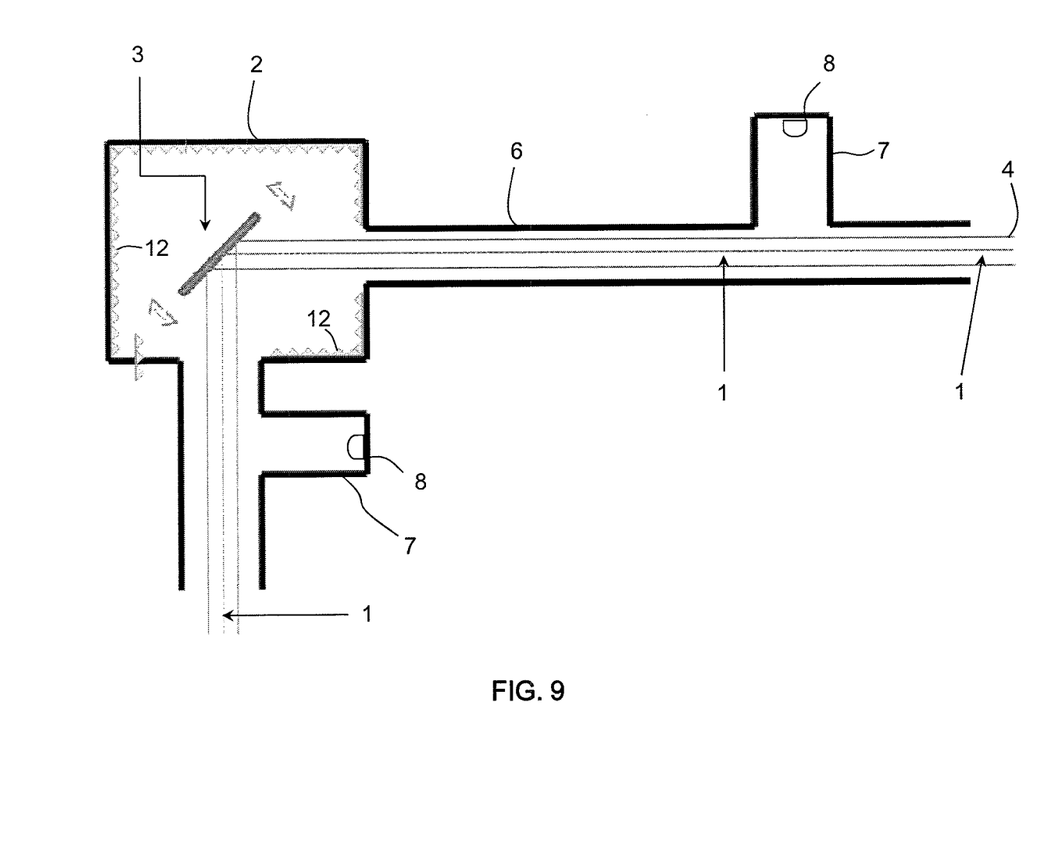
FIG. 9 is a schematic view of a further exemplifying embodiment of an apparatus according to the present invention, the housing therein comprising an entrance opening and an exit opening having tubes that are both equipped with a tube branch in order to bring about destructive interference on both sides, additional acoustic absorbers being provided on the inner wall of the housing.

The exemplifying embodiment in FIG. 9 corresponds substantially to the exemplifying embodiment of FIG. 6, the inner wall of housing 2 being equipped therein with acoustic absorbers 12. This is advantageous in that as a result of the destructive interference at the optical openings or in tubes 6, the acoustic energy is substantially reflected back into housing 2. The additional provision of acoustic absorbers 12 brings about a synergistic effect with the destructive interference actions, specifically in such a way that a reduction in the noise level inside housing 2 takes place as a result of absorbers 12 that are additionally used.

Figure 10:
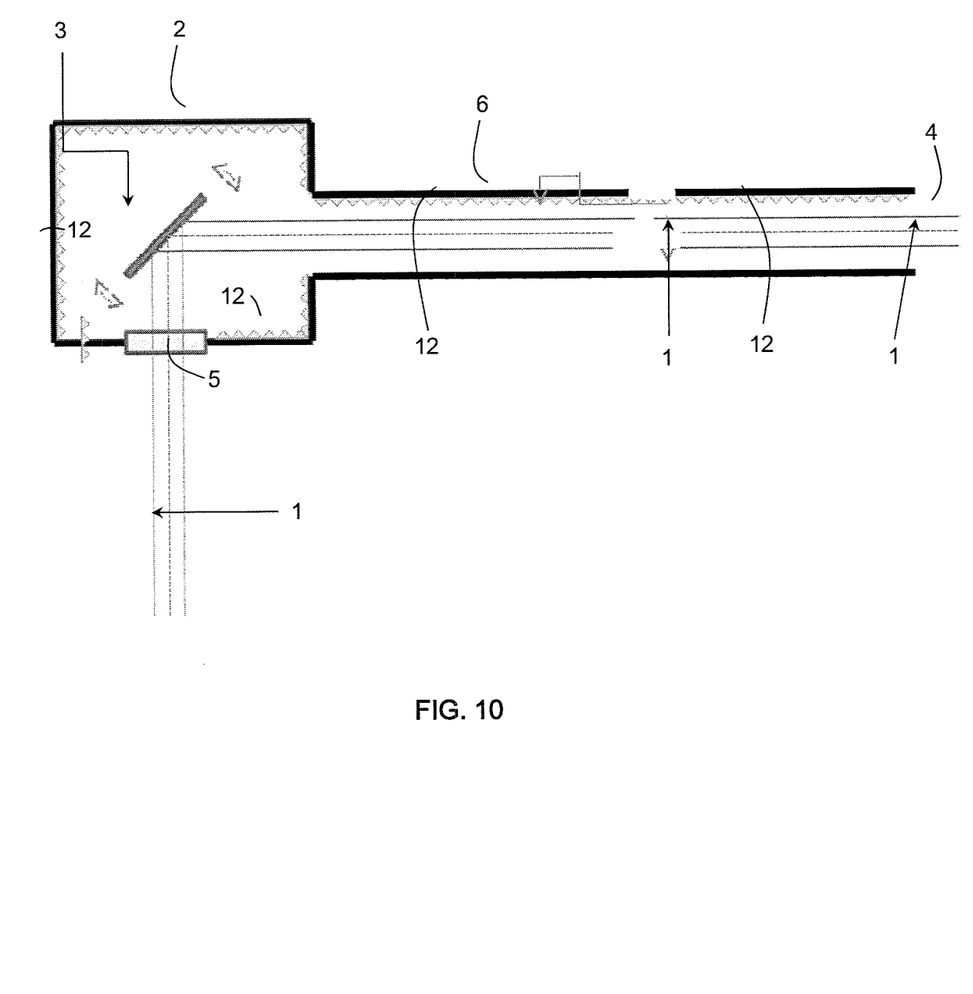
FIG. 10 is a schematic view of a further exemplifying embodiment of an apparatus according to the present invention, acoustic absorbers being embodied therein both on the inner wall of the housing and on the inner wall of a very long tube.

The exemplifying embodiment shown in FIG. 10 is relevant in the context of sound sources of variable frequency, acoustic absorbers being arranged or embodied therein both in the interior of housing 2 and in the interior of an elongated tube 6, in each case on the inner wall. In the context of a very simple embodiment, a tube 6 of this kind can be used as an optical opening in housing 2 without thereby negatively affecting the optical beam path. A kind of broad-band absorber is implemented here.

Here as well, the lining of the tube system with the absorber material has an effect according to the present invention in terms of destructive interference. Because the sound at the edge of the tube propagates more slowly, or at least at a different speed, than in the center as a result of the properties of the absorber material, the phase delay of the sound components proceeding at the edge as compared with the sound components proceeding in the center allows the formation, in particular after mixing of the two components over a longer travel distance, of a destructive interference that ultimately once again results in noise suppression toward the outside.

To avoid repetition, the reader is referred to the general section of the description and to the appended Claims regarding further advantageous embodiments of the apparatus according to the present invention.

Lastly, be it noted explicitly that the exemplifying embodiments of the apparatus according to the present invention that are described above serve merely for discussion of the teaching claimed, but do not limit it to the exemplifying embodiments.

PARTS LIST

1 Optical beam path
2 Housing, acoustic insulation housing
3 Mirror
4 Light beam, beam
5 Window
6 Tube
7 Tube branch
8 Sound reflection wall
9 Rod
10 Screw
11 Bypass
12 Absorber

The invention claimed is:

1. An apparatus for damping sound in the optical beam path of a microscope, having an acoustic insulation housing for encapsulating a sound-emitting component, the housing comprising at least one optical entrance/exit opening,
wherein the housing is embodied and/or configured in such a way that the sound otherwise emerging from the housing is largely extinguished by destructive interference without thereby influencing the optical beam,
wherein the opening is constituted by a tube extending away from the housing,
wherein the tube is equipped with at least one tube branch protruding laterally from the tube, and
wherein the tube branch is closed at the end or the tube branch is embodied as a bypass, proceeding from the tube and opening back into the tube or into the housing, having an adapted acoustic wavelength.

2. The apparatus according to claim 1, wherein an optical entrance opening and an optical exit opening are provided as separate openings; and both openings are damped with respect to acoustic emission in accordance with the same principle.

3. The apparatus according to claim 1, wherein the tube is equipped with two or more tube branches protruding laterally from the tube.

4. The apparatus according to claim 1, wherein the tube branch is closed at the end by means of a sound reflection wall.

5. The apparatus according to claim 3, wherein the tube branches are differently embodied in order to simultaneously damp different sound frequencies.

6. The apparatus according to claim 1, wherein the tube branch is constituted such that sound waves that run in the tube branch and are reflected there experience a phase change of 180° with respect to the wave running in a longitudinal direction in the tube, and result in destructive interference with the wave running in a longitudinal direction.

7. The apparatus according to claim 1, wherein tuning of the tube branch is accomplished by adapting the width/diameter and/or length of the tube branch.

8. The apparatus according to claim 7, wherein a sound reflection wall modifying the depth of the tube branch is provided in order to modify the length of the tube branch.

9. The apparatus according to claim 8, wherein the sound reflection wall is carried or constituted by an adjusting screw threadable into the end of the tube branch, or by an insertable adjusting pin, adjusting rod, or adjusting piston.

10. The apparatus according to claim 9, wherein adjustment and thus tuning of the interference conditions in the tube branch is accomplished in motorized fashion or hydraulically or pneumatically.

11. The apparatus according to claim 1, wherein tuning of the tube branch is accomplished by selecting a suitable material having defined sound absorption behavior.

12. The apparatus according to claim 1, wherein the bypass has an acoustic path length that is longer than the tube by an amount equal to half the sound wavelength.

13. The apparatus according to claim 1, wherein acoustic absorbers are provided in the interior of the housing and/or in the interior of the tube.

14. The apparatus according to claim 13, wherein the acoustic absorbers are embodied as at least partial linings of the respective inner wall surfaces.

15. A microscope having an apparatus according to claim 1.

16. The apparatus according to claim 1, wherein the sound-emitting component comprises at least one of a rapidly moving beam deflection means, an oscillating beam deflection means, or a resonantly oscillating mirror.

17. The apparatus according to claim 5, wherein the tube branches have different depths.

18. The microscope according to claim 15, wherein the microscope is a scanning microscope.

* * * * *